(12) United States Patent
Xu et al.

(10) Patent No.: US 6,379,431 B1
(45) Date of Patent: Apr. 30, 2002

(54) PRESSURE SWING ADSORPTION PROCESS WITH MULTIPLE BEDS ON PURGE AND/OR WITH TEN BEDS AND FOUR PRESSURE EQUALIZATION STEPS

(75) Inventors: Jianguo Xu, Wrightstown; Edward L. Weist, Jr., Macungie; David L. Rarig, Emmaus; James Michael Occhialini, New Tripoli; Mark Robert Pillarella, Center Valley, all of PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/488,648

(22) Filed: Jan. 20, 2000

(51) Int. Cl.$^7$ .............................................. B01D 53/047
(52) U.S. Cl. ............................ 95/100; 95/103; 95/130; 95/139; 95/140; 95/143
(58) Field of Search ...................... 95/96, 98, 100–105, 95/117–119, 122, 130, 139, 140, 143

(56) References Cited

U.S. PATENT DOCUMENTS

| | | | | |
|---|---|---|---|---|
| 3,986,849 A | | 10/1976 | Fuderer et al. ................. | 55/25 |
| 4,234,322 A | * | 11/1980 | De Meyer et al. .......... | 95/98 X |
| 4,315,759 A | * | 2/1982 | Benkmann ................. | 95/88 X |
| 4,371,380 A | * | 2/1983 | Benkmann ................. | 95/100 X |
| 4,381,189 A | * | 4/1983 | Fuderer ........................ | 95/100 |
| 4,402,712 A | * | 9/1983 | Benkmann .................... | 95/98 |
| 4,461,630 A | * | 7/1984 | Cassidy et al. ................ | 95/100 |
| 4,468,237 A | * | 8/1984 | Fuderer ........................ | 95/100 |
| 4,482,361 A | * | 11/1984 | Whysall ....................... | 95/100 |
| 4,512,778 A | * | 4/1985 | Simonet et al. ............... | 95/100 |
| 4,650,500 A | * | 3/1987 | Patel ............................ | 95/100 |
| 4,726,816 A | * | 2/1988 | Fuderer ........................ | 95/98 |
| 4,732,578 A | * | 3/1988 | Benkmann .................... | 95/98 X |
| 4,834,780 A | * | 5/1989 | Benkmann .................... | 95/98 |
| 5,174,796 A | * | 12/1992 | Davis et al. ................... | 95/100 |
| 5,203,888 A | * | 4/1993 | Maurer ........................ | 95/101 |
| 5,294,247 A | * | 3/1994 | Scharpf et al. ............... | 95/101 |

* cited by examiner

*Primary Examiner*—Robert H. Spitzer
(74) *Attorney, Agent, or Firm*—Geoffrey L. Chase

(57) ABSTRACT

A pressure swing adsorption process including an adsorption apparatus having a plurality of beds and counter-currently purging at least two of the beds simultaneously throughout the process. The number of beds and number of pressure equalization steps are not particularly limited, but a ten-bed, four pressure equalization step process in advantageous. In addition, other ten-bed, four pressure equalization step processes are disclosed which do not counter-currently purge at least two of the beds simultaneously, but which have an average of at least two of the ten beds being simultaneously regenerated by simultaneously providing off-gas from a feed end of each of the beds to an off-gas line.

7 Claims, No Drawings

PRESSURE SWING ADSORPTION PROCESS WITH MULTIPLE BEDS ON PURGE AND/OR WITH TEN BEDS AND FOUR PRESSURE EQUALIZATION STEPS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to pressure swing adsorption (PSA) processes, and more particularly to such processes employing multiple adsorbent beds and multiple pressure equalization steps.

PSA processes are well-known for the separation of gas mixtures that contain components with different adsorbing characteristics. For example, hydrogen production via pressure swing adsorption ($H_2$ PSA) is a multi-million dollar industry supplying high purity hydrogen for chemical producing industries, metals refining and other related industries.

In a typical PSA system, a multicomponent gas is passed to at least one of multiple adsorption beds at an elevated pressure to adsorb at least one strongly sorbed component while at least one component passes through. In the case of $H_2$ PSA, $H_2$ is the most weakly adsorbed component which passes through the bed. At a defined time, the feed step is discontinued and the adsorption bed is depressurized with flow co-current to the direction of the feed in one or more steps which permits essentially pure $H_2$ product to exit the bed with a high recovery of the most weakly adsorbed component, $H_2$. Then a countercurrent desorption step is carried out, followed by countercurrent purge and repressurization.

U.S. Pat. No. 3,986,849 to Fuderer et al. discloses PSA processes employing at least seven adsorbent beds, at least three steps of pressure equalization per bed. This patent teaches that an undesirable reversion of the desorbate profile from the inlet to the discharge end of the bed is substantially reduced when at least three pressure equalization stages are employed. Fuderer et al. does not disclose any embodiments comprising performing four pressure equalization steps in a ten-bed apparatus, or process cycles with on average two or more beds being purged at the same time.

The prior art in general teaches that increasing the number of beds typically facilitates increasing the number of equalizations, which minimizes the production costs of a PSA system. Unfortunately, increasing the number of beds typically increases the cost of a PSA system as well.

Accordingly, it would be very desirable to provide an improved PSA process which increases production and/or recovery per bed in a multiple bed system.

All references cited herein are incorporated herein by reference in their entireties.

BRIEF SUMMARY OF THE INVENTION

The invention provides a pressure swing adsorption process comprising providing a pressure swing adsorption apparatus having ten beds, and equalizing a pressure of each of said ten beds in four steps. At all times during the process, an average of at least two of said ten beds are being simultaneously regenerated by simultaneously providing off-gas from a product end of each of said two beds to an off-gas line. Each of the four pressure equalization steps comprises a depressurization phase spanning about $1/20$ of a total cycle time of said process and a repressurization phase spanning about $1/20$ of said total cycle time. The preferred product of the process is hydrogen.

The invention also provides a pressure swing adsorption process in which an average of at least two beds are being counter-currently purged throughout the process cycle.

BRIEF DESCRIPTION OF SEVERAL VIEWS OF THE DRAWINGS

Not applicable.

DETAILED DESCRIPTION OF THE INVENTION

In a first embodiment of the invention, the improved PSA system employs ten adsorbent beds and four steps of equalization. Preferably, an average of at least two of said ten beds are simultaneously regenerated by simultaneously providing off-gas from a feed end of each of said two beds to an off-gas line throughout said process. Preferably, each of said four steps comprises a depressurizing provide equalization phase spanning about $1/20$ of a total cycle time of said process and a repressurization phase "R" spanning about $1/20$ of said total cycle time. The preferred product of the invention is hydrogen.

A second embodiment of the invention is based on the inventors' discovery that the average bed pressure during the purge step is very important in determining the recovery and productivity of the adsorption system. It is desirable to use a longer purge time to reduce the pressure drop in the bed, and therefore reduce the average bed pressure during the purge step. The slower the purge rates, the more effective a system is in removing adsorbed gases. Thus, the second embodiment of the invention requires that, at all times throughout the process, at least two beds are being counter-currently purged at the same time.

In a preferred embodiment, the process comprises:

(a) at least one adsorption step comprising feeding a feed mixture to a feed end of a first bed, adsorbing impurities onto an adsorbent in said first bed and permitting a product gas to exit a product end of said first bed;

(b) at least one depressurizing equalization step comprising reducing a pressure in said first bed by closing a feed valve and sequentially releasing gas from a product end of said first bed to other beds or to at least one other bed and a tank;

(c) at least one pressure reduction step comprising further reducing said pressure of said first bed co-currently and/or counter-currently;

(d) at least one counter-current purging step, comprising counter-currently purging said first bed with gas from another bed for a duration such that at least two of said beds of said apparatus are being purged simultaneously throughout said process;

(e) at least one repressurizing equalization step comprising increasing the pressure of said first bed with gas released from at least one other bed and/or tank undergoing said pressure reducing step; and (f) at least one pressure augmentation step comprising further increasing said pressure of said first bed by feeding to said first bed at least one of a counter-current stream of product gas and a co-current stream of feed gas.

In certain embodiments, steps (a) to (f) are sequential.

The preferred product gas is hydrogen, but the invention is not limited thereto.

Preferably, the feed mixture comprises hydrogen and at least one member selected from the group consisting of methane, carbon dioxide, carbon monoxide, nitrogen and water vapor.

In embodiments, the feed gas is obtained by steam reforming of hydrocarbons.

In other embodiments, the feed gas is obtained by partial oxidation of hydrocarbons. In a number of these embodiments, the partial oxidation can occur in the presence of at least one catalyst.

In embodiments wherein the oxygen used for oxidation is provided by an ion transport membrane, it is preferred that the ion transport membrane be integrated with a reactor in which the partial oxidation occurs.

In embodiments, at least a part of said at least one repressurizing equalization step overlaps in time with said at least one pressure augmentation step.

In embodiments, at least a part of said at least one repressurizing equalization step overlaps in time with at least one of counter-current repressurization by the product gas and co-current repressurization by the feed gas.

In embodiments, gas from the product end of the bed in said at least one depressurizing equalization step is transferred directly to a bed in said at least one repressurizing equalization step.

In embodiments, gas from the product end of the bed in said at least one depressurizing equalization step is transferred to a tank before being transferred to a bed in said at least one repressurizing equalization step.

In embodiments, a bed being co-currently depressurized according to said at least one pressure reduction step provides purge gas to more than one other bed.

In embodiments, the depressurizing equalization step precedes said provide purge step, in other embodiments, the depressurizing equalization step overlaps in time with at least some portion of said provide purge step, and in still other embodiments, the depressurizing equalization step follows said provide purge step.

In embodiments, a bed being co-currently depressurized according to said at least one pressure reduction step provides gas for pressure equalization of at least one other bed, as well as purge gas to more than one other bed.

In embodiments, the bed at step (c) has at least one counter-current depressurization step.

In embodiments, the counter-current depressurization step immediately precedes the counter-current purge step (d).

The invention is most efficiently described through the use of cycle charts, which are readily understood by those of ordinary skill in the art. In the cycle charts shown herein, each column represents a time period of the cycle and each row represents a bed. The following table shows the cycle chart of a process that is presented for purposes of comparison only.

TABLE 1

| A | A | A | A | A | A | A | 1 | 2 | 3 | 4 | P | P | B | B | G | G | I | 4' | 3' | 2' | 1' | R |
|---|---|---|---|---|---|---|---|---|---|---|---|---|---|---|---|---|---|---|---|---|---|---|
| 1' | R | A | A | A | A | A | A | A | 1 | 2 | 3 | 4 | P | P | B | B | G | G | I | 4' | 3' | 2' |
| 3' | 2' | 1' | R | A | A | A | A | A | A | A | 1 | 2 | 3 | 4 | P | P | B | B | G | G | I | 4' |
| I | 4' | 3' | 2' | 1' | R | A | A | A | A | A | A | A | 1 | 2 | 3 | 4 | P | P | B | B | G | G |
| G | G | I | 4' | 3' | 2' | 1' | R | A | A | A | A | A | A | A | 1 | 2 | 3 | 4 | P | p | B | B |
| B | B | G | G | I | 4' | 3' | 2' | 1' | R | A | A | A | A | A | A | A | 1 | 2 | 3 | 4 | P | P |
| P | P | B | B | G | G | I | 4' | 3' | 2' | 1' | R | A | A | A | A | A | A | A | 1 | 2 | 3 | 4 |
| 3 | 4 | P | P | B | B | G | G | I | 4' | 3' | 2' | 1' | R | A | A | A | A | A | A | A | 1 | 2 |
| 1 | 2 | 3 | 4 | P | P | B | B | G | G | I | 4' | 3' | 2' | 1' | R | A | A | A | A | A | A | A |
| A | A | 1 | 2 | 3 | 4 | P | P | B | B | G | G | I | 4' | 3' | 2' | 1' | R | A | A | A | A | A |
| A | A | A | A | 1 | 2 | 3 | 4 | P | P | B | B | G | G | I | 4' | 3' | 2' | 1' | R | A | A | A |
| A | A | A | A | A | A | 1 | 2 | 3 | I | P | P | B | B | G | G | I | 4' | 3' | 2' | 1' | R | A | A |

In the first step of this cycle for the first bed, the feed goes to a bed from the feed end for ⅓ of the cycle time to produce hydrogen from the product end in the first step. During this period, the pressurized feed flows through the bed. The impurities in the feed, such as $CO_2$, methane, CO and nitrogen, are adsorbed by the adsorbents. Hydrogen, on the other hand, is less strongly adsorbed and is driven out of the bed as hydrogen product. This step is called the "adsorption" step and is indicated by "A's" in Table 1.

In the second step, feed to the first bed is stopped. The hydrogen from the product end of this bed (the first bed) is now fed to the product end of another bed (the second bed) whose pressure is being increased. That process goes on for approximately 1/24 of the cycle time, until the pressures in these two beds are almost equal. This step is indicated by "1" in the cycle chart, standing for the depressurization phase of pressure equalization step one.

In the third step, the product end of the first bed is disconnected from the second bed and connected to the product end of the third bed whose pressure is lower than the first and second beds. This goes on for approximately 1/24 of the cycle time, until the pressures in these two beds are close to each other. This step is indicated by "2" in the cycle chart, meaning that this is the depressurization phase of pressure equalization step two.

In the fourth step, the connection between these two beds is then cut off, and hydrogen from the product end of the first bed is fed to the product end of the fourth bed, whose pressure is yet lower than the third bed at the beginning of the previous step. This process again goes on for approximately ¹⁄₂₄ of the cycle time until the pressures of the two beds are close to each other. This step is indicated by "3" in the cycle chart, standing for the depressurization phase of pressure equalization step three.

In the fifth step, the connection between the first bed and the fourth bed is closed, and the hydrogen from the product end of the first bed is introduced into the fifth bed whose pressure is lower than that of the fourth bed at the beginning of the previous step, and which has just finished the "purge" step (step 8) and idle step (step 9). This process again lasts for ¹⁄₂₄ of the cycle time, and at the end of this step, the pressures in these two beds are again close to each other. This step is indicated by "4" in the cycle chart, representing the depressurization phase of pressure equalization step four.

In the sixth step, the connection between the first bed and the fifth bed is closed, and the gas from the product end of the first bed is introduced to the product end of the sixth bed. The feed end of the bed being purged (the sixth bed) is connected to the offgas line and the gas purged from this bed enters the offgas line. This step lasts for approximately ¹⁄₁₂ of the cycle time, and is called the "provide purge" step, indicated by "P's" in the cycle chart.

In the seventh step, the product end valve is closed and the feed end is connected to the offgas line. The gas in the bed goes to the offgas line. This step lasts for ¹⁄₁₂ of the cycle time and is called the "countercurrent blowdown" step and is indicated by "B's" in the chart.

In the eighth step, the product end of the bed is connected to the product end of a bed in its sixth step (the "provide purge" step). The gas from the "provide purge" bed purges the bed and the impurities and some hydrogen gas leave this first bed (the bed being purged) from the feed end and enters the offgas line. This step lasts about for ¹⁄₁₂ of the cycle time and is called the "countercurrent purge" step. It is indicated by "G's" in the cycle chart.

In the ninth step, the bed is closed on both ends for ¹⁄₂₄ of the cycle time and this step is called the "idle" step, indicated by "I" in the cycle chart.

In the tenth step, the product end of the bed is connected to the product end of a bed at its fifth step. Gas flows from the product end of the bed at its fifth step and enters this bed from its product end. This takes about ¹⁄₂₄ of the cycle time until the pressures in the two beds are close to each other. This step is indicated by "4'", indicating that it is at the receiving gas end of the fourth pressure equalization step following the sequence order of the pressure equalization steps. That is, "4'" indicates the repressurization phase of the fourth pressure equalization step.

In the eleventh step, the product end of the bed is connected to the bed at the fourth step. Gas flows from the product end of the bed at its fourth step and enters this bed from its product end. This takes about ¹⁄₂₄ of the cycle time until the pressures in the two beds are close to each other. This step is indicated by "3'", indicating that it is at the receiving gas end of third pressure equalization step. That is, "3'" indicates the repressurization phase of the third pressure equalization step.

In the twelfth step, the product end of the bed is connected to the bed at the third step. Gas flows from the product end of the bed at its third step and enters this bed from its product end. This takes about ¹⁄₂₄ of the cycle time until the pressures in the two beds are close to each other. This step is indicated by "2'", indicating that it is at the receiving gas end of the second pressure equalization step. That is, "2'" indicates the repressurization phase of the second pressure equalization step.

In the thirteenth step, the product end of the bed is connected to the bed at the second step. Gas flows from the product end of the bed at its second step and enters this bed from its product end. This takes about ¹⁄₂₄ of the cycle time until the pressures in the two beds are close to each other. Some product gas also enters the product end of this bed. This step is indicated by "1'", indicating that it is at the receiving gas end of the first pressure equalization step. That is, "1'" indicates the repressurization phase of the first pressure equalization step.

Then in the fourteenth step, the connection between these two beds is closed while the gas from the product line continues to re-pressurize the bed until the pressure in the bed is close to that of the product hydrogen. This step takes approximately ¹⁄₂₄ of the cycle time and is indicated by the letter "R" in the chart for "repressurization." After this step is finished, the bed returns to step 1.

The cycles of the twelve beds of Table 1 are staggered such that one bed starts adsorption ¹⁄₁₂ of the cycle time later than the previous one. Such a cycle has four beds generating products all the time. The time for pressure equalization does not have to be exactly $1/(2 \times n)$, in which "n" is the number of beds in the system. When the time for the first step of pressure equalization, "1", is "t" less than $1/(2 \times n)$ of the cycle time, the time for the receiving pressure equalization step, 1', is decreased by the same amount, while the time for re-pressurization step "R" is increased by the same amount. The time for the second pressure equalization step on both providing gas end and receiving gas end, 2 and 2', can be increased by the same amount. If the first and second equalization share a common valve/line arrangement and the third and fourth equalization share a common valve/line arrangement, the time for the third pressure equalization step on both providing gas end and receiving gas end, 3 and 3', must be reduced by at least t. The time for the fourth pressure equalization step on both providing gas end and receiving gas end, 4 and 4', can be increased by the same amount. The time for the idle can be decreased by the same amount. The same holds true for all the cycles discussed below (the idle step and the step solely consisting of providing gas for the lowest pressure equalization step, 4, do not exist for all the cycles).

The following table shows the cycle chart of a ten-bed cycle of the first embodiment of the invention with only two beds on adsorption:

TABLE 2

| A  | A  | A  | A  | 1  | 2  | 3  | 4  | P  | P  | B  | B  | G  | G  | I  | 4' | 3' | 2' | 1' | R  |
|----|----|----|----|----|----|----|----|----|----|----|----|----|----|----|----|----|----|----|----|
| 1' | R  | A  | A  | A  | A  | 1  | 2  | 3  | 4  | P  | P  | B  | B  | G  | G  | I  | 4' | 3' | 2  |
| 3' | 2' | 1' | R  | A  | A  | A  | A  | 1  | 2  | 3  | 4  | P  | P  | B  | B  | G  | G  | I  | 4' |
| I  | 4' | 3' | 2' | 1' | R  | A  | A  | A  | A  | 1  | 2  | 3  | 4  | P  | P  | B  | B  | G  | G  |
| G  | G  | I  | 4' | 3' | 2' | 1' | R  | A  | A  | A  | A  | 1  | 2  | 3  | 4  | P  | P  | B  | B  |
| B  | B  | G  | G  | I  | 4' | 3' | 2' | 1' | R  | A  | A  | A  | A  | 1  | 2  | 3  | 4  | P  | P  |
| P  | P  | B  | B  | G  | G  | I  | 4' | 3' | 2' | 1' | R  | A  | A  | A  | A  | 1  | 2  | 3  | 4  |
| 3  | 4  | P  | P  | B  | B  | G  | G  | I  | 4' | 3' | 2' | 1' | R  | A  | A  | A  | A  | 1  | 2  |
| 1  | 2  | 3  | 4  | P  | P  | B  | B  | G  | G  | 1  | 4' | 3' | 2' | 1' | R  | A  | A  | A  | A  |
| A  | A  | 1  | 2  | 3  | 4  | P  | P  | B  | B  | G  | G  | I  | 4' | 3' | 2' | 1' | R  | A  | A  |

In this cycle, the bed is on adsorption for 1/5 of the cycle time. It then provides gas from the product end of the bed in the first, second, third, and fourth steps of pressure equalization sequentially, with each step lasting approximately 1/20 of the cycle time. The bed then provides gas for purge, again from the product end of the bed, for approximately 1/10 of the cycle time. Then the product end of the bed is closed and the feed end valve to the offgas line is opened. The gas in the bed is sent to the offgas line for approximately 1/10 of the cycle time, until the pressure in the bed is not much greater than that in the offgas line. Then the product end of the bed is connected to the product end of a bed that is at its "provide purge" step. This mostly hydrogen gas flows from the bed at its "provide purge" step to the bed under description, driving out some of the impurities in the bed to the offgas line. This lasts for approximately 1/10 of the cycle time. Then the bed sits idle for approximately 1/20 of the cycle time. It then receives gas from the product end of the bed in the steps of receiving pressure equalization, indicated by 4', 3', 2', and 1' in the cycle chart (i.e., Table 1), with each step lasting for approximately 1/20 of the cycle time, until the pressure of the bed is close to that in the bed providing gas for pressure equalization in each step. In the last of these receiving pressure equalization gas steps, some product gas is also fed to the product end of the bed. Then, in the last step, the connection of this bed with the provide equalization gas bed is cut and the product gas continues to enter the bed from the product end for approximately 1/20 of the cycle time until the pressure of the bed is close to that of the product. This bed thereby completes one cycle and returns to the adsorption step. The ten beds are staggered by starting the cycle of the subsequent bed 1/10 of the cycle time later than the previous step so that there are two beds on adsorption all the time. In addition, two beds are under regeneration at any given time.

Given the fact that the mass transfer layer has certain length, it is still desirable to have more beds on feed if doing so does not cause a large negative impact on performance by reducing the time for other steps. Notice that in the process whose cycle chart is shown in Table 2, 1/20 of the cycle time is idle, meaning that the bed is not used in that 5% of the cycle time. That idle time can be used for adsorption by shifting it to the adsorption step. In order to maintain synchronization of the beds providing gas for pressure equalization and those receiving gas for pressure equalization, and to have three beds on adsorption all the time, one more of these 1/20 cycle slots has to be allocated to adsorption. This can be accomplished by eliminating the fourth step of providing gas for pressure equalization, and providing the gas for the fourth step of pressure equalization from the bed that is providing gas for purge at that time, as shown in the following table:

TABLE 3

| A  | A  | A  | A  | A  | A  | 1  | 2  | 3  | P' | P  | B  | B  | G  | G  | 4' | 3' | 2' | 1' | R  |
|----|----|----|----|----|----|----|----|----|----|----|----|----|----|----|----|----|----|----|----|
| 1' | R  | A  | A  | A  | A  | A  | A  | 1  | 2  | 3  | P' | P  | B  | B  | G  | G  | 4' | 3' | 2' |
| 3' | 2' | 1' | R  | A  | A  | A  | A  | A  | A  | 1  | 2  | 3  | P' | P  | B  | B  | G  | G  | 4' |
| G  | 4' | 3' | 2' | 1' | R  | A  | A  | A  | A  | A  | A  | 1  | 2  | 3  | P' | P  | B  | B  | G  |
| B  | G  | G  | 4' | 3' | 2' | 1' | R  | A  | A  | A  | A  | A  | A  | 1  | 2  | 3  | P' | P  | B  |
| P  | B  | B  | G  | G  | 4' | 3' | 2' | 1' | R  | A  | A  | A  | A  | A  | A  | 1  | 2  | 3  | P' |
| 3  | P' | P  | B  | B  | G  | G  | 4' | 3' | 2' | 1' | R  | A  | A  | A  | A  | A  | A  | 1  | 2  |
| 1  | 2  | 3  | P' | P  | B  | B  | G  | G  | 4' | 3' | 2' | 1' | R  | A  | A  | A  | A  | A  | A  |
| A  | A  | 1  | 2  | 3  | P' | P  | B  | B  | G  | G  | 4' | 3' | 2' | 1' | R  | A  | A  | A  | A  |
| A  | A  | A  | A  | 1  | 2  | 3  | P' | P  | B  | B  | G  | G  | 4' | 3' | 2' | 1' | R  | A  | A  |

In this cycle, in the first 1/20 of the cycle time of the provide purge step (indicated by "P'"s), the provide purge bed simultaneously provides gas to the bed in its purge step (indicated by "G"s) and to the bed on the receiving end of the fourth step of pressure equalization (indicated by "4'"). The rest is kept as in the cycle shown in Table 2.

In yet another embodiment, two beds are always on adsorption. After the completion of the adsorption step, the bed goes through four steps of pressure equalization on the provide gas side. Then the bed provides gas for purge for 3/20 of the cycle time, followed by 1/20 of the cycle time for blowdown, 3/20 of the cycle time for purge, 4 steps of pressure equalization on the receiving gas end, and 1/20 of the cycle time for re-pressurization, as shown in the following table:

TABLE 4

| A  | A  | A  | A  | 1  | 2  | 3  | 4  | P  | P  | P  | B  | G  | G  | G  | 4' | 3' | 2' | 1' | R  |
|----|----|----|----|----|----|----|----|----|----|----|----|----|----|----|----|----|----|----|----|
| 1' | R  | A  | A  | A  | A  | 1  | 2  | 3  | 4  | P  | P  | P  | B  | G  | G  | G  | 4' | 3' | 2' |
| 3' | 2' | 1' | R  | A  | A  | A  | A  | 1  | 2  | 3  | 4  | P  | P  | P  | B  | G  | G  | G  | 4' |
| G  | 4' | 3' | 2' | 1' | R  | A  | A  | A  | A  | 1  | 2  | 3  | 4  | P  | P  | P  | B  | G  | G  |
| G  | G  | G  | 4' | 3' | 2' | 1' | R  | A  | A  | A  | A  | 1  | 2  | 3  | 4  | P  | P  | P  | B  |
| P  | B  | G  | G  | G  | 4' | 3' | 2' | 1' | R  | A  | A  | A  | A  | 1  | 2  | 3  | 4  | P  | P  |
| P  | P  | P  | B  | G  | G  | G  | 4' | 3' | 2' | 1' | R  | A  | A  | A  | A  | 1  | 2  | 3  | 4  |
| 3  | 4  | P  | P  | P  | B  | G  | G  | G  | 4' | 3' | 2' | 1' | R  | A  | A  | A  | A  | 1  | 2  |
| 1  | 2  | 3  | 4  | P  | P  | P  | B  | G  | G  | G  | 4' | 3' | 2' | 1' | R  | A  | A  | A  | A  |
| A  | A  | 1  | 2  | 3  | 4  | P  | P  | P  | B  | G  | G  | G  | 4' | 3' | 2' | 1' | R  | A  | A  |

Tables 2–4 show the first embodiment of the invention, wherein the PSA system employs ten adsorbent beds and four steps of equalization. Table 5, below, shows a cycle chart for a process in accordance with the first and second embodiments of the invention. That is, in addition to having ten adsorbent beds and four steps of equalization, the process of Table 5 has at least two beds being counter-currently purged at any given time.

Increasing the purge time can improve the adsorption capacity and increase recovery simultaneously. Increasing the purge time also increases the provide purge time following the conventional ways of constructing cycles. In the following embodiment, one provide purge bed provides the purge gas for two beds:

In addition, this bed is also used to provide the gas for the fourth step of pressure equalization during the first half of the provide purge step (P'). This enables doubling the purge time, and at the same time employing four steps of pressure equalization for a ten-bed system with two beds on adsorption.

The second embodiment of the invention is not limited to ten-bed devices or four equalization steps, as in the process depicted in Table 5.

For example, a 12 bed cycle with double purge time, 4 steps of pressure equalization and 3 beds on adsorption is shown in the following table:

TABLE 5

| A  | A  | A  | A  | 1  | 2  | 3  | P' | P  | B  | B  | G  | G  | G  | G  | 4' | 3' | 2' | 1' | R  |
|----|----|----|----|----|----|----|----|----|----|----|----|----|----|----|----|----|----|----|----|
| 1' | R  | A  | A  | A  | A  | 1  | 2  | 3  | P' | P  | B  | B  | G  | G  | G  | G  | 4' | 3' | 2' |
| 3' | 2' | 1' | R  | A  | A  | A  | A  | 1  | 2  | 3  | P' | P  | B  | B  | G  | G  | G  | G  | 4' |
| G  | 4' | 3' | 2' | 1' | R  | A  | A  | A  | A  | 1  | 2  | 3  | P' | P  | B  | B  | G  | G  | G  |
| G  | G  | G  | 4' | 3' | 2' | 1' | R  | A  | A  | A  | A  | 1  | 2  | 3  | P' | P  | B  | B  | G  |
| B  | G  | G  | G  | G  | 4' | 3' | 2' | 1' | R  | A  | A  | A  | A  | 1  | 2  | 3  | P' | P  | B  |
| P  | B  | B  | G  | G  | G  | G  | 4' | 3' | 2' | 1' | R  | A  | A  | A  | A  | 1  | 2  | 3  | P' |
| 3  | P' | P  | B  | B  | G  | G  | G  | G  | 4' | 3' | 2' | 1' | R  | A  | A  | A  | A  | 1  | 2  |
| 1  | 2  | 3  | P' | P  | B  | B  | G  | G  | G  | G  | 4' | 3' | 2' | 1' | R  | A  | A  | A  | A  |
| A  | A  | 1  | 2  | 3  | P' | P  | B  | B  | G  | G  | G  | G  | 4' | 3' | 2' | 1' | R  | A  | A  |

TABLE 6

| A  | A  | A  | A  | A  | A  | 1  | 2  | 3  | P' | P  | B  | B  | G  | G  | G  | G  | 4' | 3' | 2' | 1' | I  | R  | R  |
|----|----|----|----|----|----|----|----|----|----|----|----|----|----|----|----|----|----|----|----|----|----|----|----|
| R  | R  | A  | A  | A  | A  | A  | A  | 1  | 2  | 3  | P' | P  | B  | B  | G  | G  | G  | G  | 4' | 3' | 2' | 1' | I  |
| 1' | I  | R  | R  | A  | A  | A  | A  | A  | A  | 1  | 2  | 3  | P' | P  | B  | B  | G  | G  | G  | G  | 4' | 3' | 2' |
| 3' | 2' | 1' | I  | R  | R  | A  | A  | A  | A  | A  | A  | 1  | 2  | 3  | P' | P  | B  | B  | G  | G  | G  | G  | 4' |
| G  | 4' | 3' | 2' | 1' | I  | R  | R  | A  | A  | A  | A  | A  | A  | 1  | 2  | 3  | P' | P  | B  | B  | G  | G  | G  |
| G  | G  | G  | 4' | 3' | 2' | 1' | I  | R  | R  | A  | A  | A  | A  | A  | A  | 1  | 2  | 3  | P' | P  | B  | B  | G  |
| B  | G  | G  | G  | G  | 4' | 3' | 2' | 1' | J  | R  | R  | A  | A  | A  | A  | A  | A  | i  | 2  | 3  | P' | P  | B  |
| P  | B  | B  | G  | G  | G  | G  | 4' | 3' | 2' | 1' | i  | R  | R  | A  | A  | A  | A  | A  | A  | 1  | 2  | 3  | P' |
| 3  | p' | p  | e  | B  | G  | G  | G  | G  | 4' | 3' | 2' | 1' | I  | R  | R  | A  | A  | A  | A  | A  | A  | 1  | 2  |
| 1  | 2  | 3  | P' | P  | B  | B  | G  | G  | G  | G  | 4' | 3' | 2' | 1' | I  | R  | R  | A  | A  | A  | A  | A  | A  |
| A  | A  | 1  | 2  | 3  | P' | P  | B  | B  | G  | G  | G  | G  | 4' | 3' | 2' | 1' | I  | R  | R  | A  | A  | A  | A  |
| A  | A  | A  | A  | 1  | 2  | 3  | P' | P  | B  | B  | G  | G  | G  | G  | 4' | 3' | 2' | 1' | R  | R  | A  | A  |    |

In the process shown in Table 6, the highest pressure equalization step is separate from the product re-pressurization step. The bed providing purge gas provides purge gas to two beds. In the first half of the providing purge gas step (P'), this bed also provides gas to the lowest pressure step of pressure equalization.

A 12 bed cycle with double purge time, 4 steps of pressure equalization and 4 beds on adsorption is shown in the following table:

TABLE 7

| A | A | A | A | A | A | A | A | 1 | 2 | 3 | P' | P | B | B | G | G | G | G | 4' | 3' | 2 | 1' | R |
|---|---|---|---|---|---|---|---|---|---|---|---|---|---|---|---|---|---|---|---|---|---|---|---|
| 1' | R | A | A | A | A | A | A | A | 1 | 2 | 3 | P' | P | B | B | G | G | G | G | 4' | 3' | 2' |   |
| 3' | 2' | 1' | R | A | A | A | A | A | A | 1 | 2 | 3 | P' | P | B | B | G | G | G | G | 4' |   |   |
| G | 4' | 3 | 2' | 1' | R | A | A | A | A | A | A | 1 | 2 | 3 | P' | P | B | B | G | G | G |   |   |
| G | G | G | 4' | 3' | 2' | 1' | R | A | A | A | A | A | A | 1 | 2 | 3 | P' | P | B | B | G |   |   |
| B | G | G | G | G | 4' | 3' | 2' | 1' | R | A | A | A | A | A | A | 1 | 2 | 3 | P' | P | B |   |   |
| P | B | B | G | G | G | G | 4' | 3' | 2' | 1' | R | A | A | A | A | A | A | 1 | 2 | 3 | P' |   |   |
| 3 | P' | P | B | B | G | G | G | G | 4' | 3' | 2' | 1' | R | A | A | A | A | A | A | 1 | 2 |   |   |
| 1 | 2 | 3 | P' | P | B | B | G | G | G | G | 4' | 3' | 2' | 1' | R | A | A | A | A | A | A |   |   |
| A | A | 1 | 2 | 3 | P' | P | B | B | G | G | G | G | 4' | 3' | 2' | 1' | R | A | A | A | A |   |   |
| A | A | A | A | 1 | 2 | 3 | P' | P | B | B | G | G | G | G | 4' | 3' | 2' | 1' | R | A | A |   |   |
| A | A | A | A | A | A | 1 | 2 | 3 | P' | P | B | B | G | G | G | G | 4' | 3' | 2' | 1' | R | A | A |

In the process shown in Table 7, the bed providing purge gas provides purge gas to two beds. In the first half of the providing purge gas step, this bed also provides gas to the lowest pressure step of pressure equalization.

A 12 bed cycle with triple purge time, 4 steps of pressure equalization and 3 beds on adsorption is shown in the following table:

TABLE 8

| A | A | A | A | A | 1 | 2 | 3 | P' | P | B | B | G | G | G | G | G | G | 4' | 3' | 2' | 1' | R |
|---|---|---|---|---|---|---|---|---|---|---|---|---|---|---|---|---|---|---|---|---|---|---|
| 1' | R | A | A | A | A | A | 1 | 2 | 3 | P' | P | B | B | G | G | G | G | G | G | 4' | 3' | 2' |
| 3' | 2' | 1' | R | A | A | A | A | A | 1 | 2 | 3 | P' | P | B | B | G | G | G | G | G | G | 4' |
| G | 4' | 3' | 2' | 1' | R | A | A | A | A | A | 1 | 2 | 3 | P' | P | B | B | G | G | G | G | G |
| G | G | G | 4' | 3' | 2' | 1' | R | A | A | A | A | A | 1 | 2 | 3 | P' | P | B | B | G | G | G |
| G | G | G | G | G | 4' | 3' | 2' | 1' | R | A | A | A | A | A | 1 | 2 | 3 | P' | P | B | B | G |
| B | G | G | G | G | G | G | 4' | 3' | 2' | 1' | R | A | A | A | A | A | 1 | 2 | 3 | P' | P | B |
| P | B | B | G | G | G | G | G | G | 4' | 3' | 2' | 1' | R | A | A | A | A | A | 1 | 2 | 3 | P' |
| 3 | P' | P | B | B | G | G | G | G | G | G | 4' | 3' | 2' | 1' | R | A | A | A | A | A | 1 | 2 |
| 1 | 2 | 3 | P' | P | B | B | G | G | G | G | G | G | 4' | 3' | 2' | 1' | R | A | A | A | A | A |
| A | A | 1 | 2 | 3 | P' | P | B | B | G | G | G | G | G | G | 4' | 3' | 2' | 1' | R | A | A | A |
| A | A | A | A | 1 | 2 | 3 | P' | P | B | B | G | G | G | G | G | G | 4' | 3' | 2' | 1' | R | A | A |

In the process shown in Table 8, the bed providing purge gas provides purge gas to three beds. In the first half of the providing purge gas step (P'), this bed also provides gas to the lowest pressure step of pressure equalization.

Tables 5–8 are illustrative and not limiting. For example, the increased purge time embodiment of the invention encompasses the use of any number of beds, although 10–12 beds are preferred, and encompasses cycles with less or more than four steps of pressure equalization.

The invention will be illustrated in more detail with reference to the following Examples, but it should be understood that the present invention is not deemed to be limited thereto.

EXAMPLE 1

The unexpected advantages of the invention are demonstrated by the following simulation comparing a ten-bed embodiment of the invention (see Table 2, above) with a twelve-bed cycle in accordance with the prior art (see Table 1, above).

The pressure and temperature specified in the simulations were 30 atmospheres and 100° F., respectively. The composition specified in the simulations contained 0.5% nitrogen, 6% methane, 16% carbon dioxide, 3.5% carbon monoxide and 74% hydrogen. The key operating parameters and results are summarized in Table 9:

TABLE 9

| Cycle | Table 1 (Comparative) | Table 2 (Invention) |
|---|---|---|
| Bed diameter (ft) | 11.0 | 11.5 |
| Bed length (ft) | 22.4 | 22.4 |

TABLE 9-continued

| Cycle | Table 1 (Comparative) | Table 2 (Invention) |
|---|---|---|
| Feed time(s) | 240 | 128 |
| Production (million scf/d) | 84.2 | 83.5 |
| Recovery | 88.2% | 88.0% |
| CO in product (ppm) | 1.0 | 1.0 |
| $N_2$ in product (ppm) | 620 | 332 |

It can be seen from Table 9 that the recoveries of the two cycles are virtually the same. The $N_2$ content is much lower with the ten-bed cycle according to the invention. The amount of adsorbent needed for a certain production rate is reduced by 9%, and the number of beds is reduced from 12 to 10. That not only means that the costs of vessels and skids are reduced, it also means that the costs of valves and connecting pipes connecting these beds are reduced as the consequence of bed reduction.

EXAMPLE 2

The efficacy of increasing the purge time in accordance with the invention can be demonstrated by comparing the simulation results of the process of Table 1 (i.e., a 12 bed cycle with 4 beds on adsorption and 4 steps of pressure equalization) with those of Table 5 (i.e., a 10 bed cycle with 4 steps of pressure equalization, double purge time, and 2 beds on adsorption). The pressure and temperature specified in the simulations were 30 atmospheres and 100° F., respectively. The composition specified in the simulations contained 0.5% nitrogen, 6% methane, 16% carbon dioxide, 3.5% carbon monoxide and 74% hydrogen. Each bed has two sections: (1) a section closer to the feed nozzle, with 50% of the bed length, containing carbon adsorbent; and (2) a section further from the feed nozzle containing a zeolite adsorbent. The key operating parameters and results are summarized in Table 10:

TABLE 10

| Cycle | Table 1 (Comparative) | Table 5 (Invention) |
|---|---|---|
| Bed Diameter (ft) | 11.0 | 11.0 |
| Bed length (ft) | 22.4 | 22.4 |
| Hydrogen Production (million scf/d) | 84.2 | 79.9 |
| Hydrogen Recovery | 88.2 | 89.21 |
| CO in product (ppm) | 1.0 | 0.2 |
| Nitrogen in product (ppm) | 620 | 1005 |

It can be seen from Table 10 that using the cycle in Table 5, it is possible to eliminate two beds and the associated valves, piping and adsorbents, and at the same time increase hydrogen recovery by 1%. Moreover, the diameters of the beds in this cycle are smaller. The total amount of adsorbent is reduced by 36%. If the bed diameters were equal, the hydrogen production would be greater for the cycle in Table 5 with a similar recovery benefit. The modifications that may be needed to achieve these are (1) arranging piping and valves such that one provide purge bed can provide gas to three beds with the desired flows, and (2) arranging pipes and valves such that off-gas can be collected from one blowdown bed and two purge beds. One way of doing so is to use a valve with a positioner on the off-gas line of each bed so that the off-gas flow from each individual bed can be independently controlled.

While the invention has been described in detail and with reference to specific examples thereof, it will be apparent to one skilled in the art that various changes and modifications can be made therein without departing from the spirit and scope thereof.

What is claimed is:

1. A pressure swing adsorption process comprising providing a pressure swing adsorption apparatus having ten beds, and equalizing a pressure of each of said ten beds in four steps, represented by the following cycle chart:

| A | A | A | A | 1 | 2 | 3 | 4 | P | P |
|---|---|---|---|---|---|---|---|---|---|
| 1' | R | A | A | A | A | 1 | 2 | 3 | 4 |
| 3' | 2' | 1' | R | A | A | A | A | 1 | 2 |
| I | 4' | 3' | 2' | 1' | R | A | A | A | A |
| G | G | I | 4' | 3' | 2' | 1' | R | A | A |
| B | B | G | G | I | 4' | 3' | 2' | 1' | R |
| P | P | B | B | G | G | I | 4' | 3' | 2' |
| 3 | 4 | P | P | B | B | G | G | I | 4' |
| 1 | 2 | 3 | 4 | P | P | B | B | G | G |
| A | A | 1 | 2 | 3 | 4 | P | P | B | B |
| B | B | G | G | I | 4' | 3' | 2' | 1' | R |
| P | P | B | B | G | G | I | 4' | 3' | 2' |
| 3 | 4 | P | P | B | B | G | G | I | 4' |
| 1 | 2 | 3 | 4 | P | P | B | B | G | G |
| A | A | 1 | 2 | 3 | 4 | P | P | B | B |
| A | A | A | A | 1 | 2 | 3 | 4 | P | P |
| 1' | R | A | A | A | A | 1 | 2 | 3 | 4 |
| 3' | 2' | 1' | R | A | A | A | A | 1 | 2 |
| I | 4' | 3' | 2' | 1' | R | A | A | A | A |
| G | G | I | 4' | 3' | 2' | 1' | R | A | A | wherein A is adsorption, 1 is providing gas for a first step of pressure equalization, 2 is providing gas for a second step of pressure equalization, 3 is providing gas for a third step of pressure equalization, 4 is providing gas for a fourth step of pressure equalization, P is providing purge gas, B is counter-current blowdown, G is counter-current purge, I is idle, 4' is receiving gas for the fourth step of pressure equalization, 3' is receiving gas for the third step of pressure equalization, 2' is receiving gas for the second step of pressure equalization, and 1' is receiving gas for the first step of pressure equalization and simultaneously receiving product gas for repressurization, and R is repressurizing with product gas.

2. A pressure swing adsorption process comprising providing a pressure swing adsorption apparatus having ten beds, and equalizing a pressure of each of said ten beds In four steps represented by the following cycle chart:

| A | A | A | A | A | A | 1 | 2 | 3 | P' | P | B | B | G | G | 4' | 3' | 2' | 1' | R |
|---|---|---|---|---|---|---|---|---|---|---|---|---|---|---|---|---|---|---|---|
| 1' | R | A | A | A | A | A | 1 | 2 | 3 | P' | P | B | B | G | G | 4' | 3' | 2' |   |
| 3' | 2' | 1' | R | A | A | A | A | A | 1 | 2 | 3 | P' | P | B | B | G | G | 4' |   |
| G | 4' | 3' | 2' | 1' | R | A | A | A | A | A | 1 | 2 | 3 | P' | P | B | B | G |   |
| B | G | G | 4' | 3 | 2' | 1 | A | A | A | A | A | A | 1 | 2 | 3 | P | P | B |   |
| P | B | B | G | G | 4' | 3' | 2' | 1' | R | A | A | A | A | A | 1 | 2 | 3 | P |   |
| 3 | P' | P | B | B | G | G | 4' | 3' | 2' | 1' | R | A | A | A | A | A | 1 | 2 |   |
| 1 | 2 | 3 | P' | P | B | S | G | G | 4 | 3' | 2' | 1' | R | A | A | A | A | A |   |
| A | A | 1 | 2 | 3 | P' | P | B | B | G | G | 4' | 3' | 2' | 1' | R | A | A | A | A |
| A | A | A | A | 1 | 2 | 3 | P' | P | B | B | G | G | 4' | 3' | 2' | 1' | R | A | A | wherein A is adsorption, 1 is providing gas for a first step of pressure equalization, 2 is providing gas for a second step of pressure equalization, 3 is providing gas for a third step of pressure equalization, P' is providing purge gas and simultaneously providing gas for a fourth stop of pressure equalization, P is providing purge gas, B is counter-current blowdown, G is counter-current purge, 4' is receiving gas for the fourth step of pressure equalization, 3' is receiving gas for the third step of pressure equalization, 2' is receiving gas for the second step of pressure equalization, and 1' is receiving gas for the first step of pressure equalization and simultaneously receiving product gas for repressurization, and R is repressurizing with product gas.

3. A pressure swing adsorption process comprising providing a pressure swing adsorption apparatus having ten beds, and equalizing a pressure of each of said ten beds in four steps represented by the following cycle chart:

| A | A | A | A | 1 | 2 | 3 | 4 | P | P | P | B | G | G | G | 4' | 3' | 2' | 1' | R |
|---|---|---|---|---|---|---|---|---|---|---|---|---|---|---|----|----|----|----|---|
| 1' | R | A | A | A | A | 1 | 2 | 3 | 4 | P | P | P | B | G | G | G | 4' | 3' | 2' |
| 3' | 2' | 1' | R | A | A | A | A | 1 | 2 | 3 | 4 | P | P | P | B | G | G | G | 4' |
| G | 4' | 3' | 2' | 1' | R | A | A | A | A | 1 | 2 | 3 | 4 | P | P | P | B | G | G |
| G | G | G | 4' | 3' | 2' | 1' | R | A | A | A | A | 1 | 2 | 3 | 4 | P | P | P | B |
| P | B | G | G | G | 4 | '3' | 2' | 1' | R | A | A | A | A | 1 | 2 | 3 | 4 | P | P |
| P | P | P | B | G | G | G | 4' | 3' | 2' | 1' | R | A | A | A | A | 1 | 2 | 3 | 4 |
| 3 | 4 | P | P | P | B | G | G | G | 4' | 3' | 2' | 1' | R | A | A | A | A | 1 | 2 |
| 1 | 2 | 3 | 4 | P | P | P | B | G | G | G | 4' | 3' | 2' | 1' | R | A | A | A | A |
| A | A | 1 | 2 | 3 | 4 | P | p | P | B | G | G | G | 4' | 3' | 2' | 1' | R | A | A | wherein A is adsorption, 1 is a first step of pressure equalization, 2 is a second step of pressure equalization, 3 is a third step of pressure equalization, 4 is a fourth step of pressure equalization, P is purge, B is counter-current blowdown, G is counter-current purge, 4' is receive gas for the fourth step of pressure equalization, 3' is receive gas for the third step of pressure equalization, 2' is receive gas for the second step of pressure equalization, and 1' is receive gas for the first step of pressure equalization and simultaneously receive product gas for re-pressurization, and R is bed repressurizing with product gas.

4. A pressure swing adsorption process comprising providing a pressure swing adsorption apparatus having ten beds, and equalizing a pressure of each of said ten beds in four steps wherein at all times during said process, an average of at least two of said ten beds are being counter-currently purged represented by the following cycle chart:

| A | A | A | A | 1 | 2 | 3 | P' | P | B | B | G | G | G | 4' | 3' | 2' | 1' | R |
|---|---|---|---|---|---|---|----|---|---|---|---|---|---|----|----|----|----|---|
| 1' | R | A | A | A | A | 1 | 2 | 3 | P' | P | B | B | G | G | G | 4' | 3' | 2' |
| 3' | 2' | 1' | R | A | A | A | A | 1 | 2 | 3 | P' | P | B | B | G | G | G | 4' |
| G | 4' | 3' | 2 | 1 | R | A | A | A | A | 1 | 2 | 3 | P' | P | B | B | G | G | G |
| G | G | G | 4' | 3' | 2' | 1' | R | A | A | A | A | 1 | 2 | 3 | P' | P | E | B | G |
| B | G | G | G | 4' | 3' | 2' | 1' | R | A | A | A | A | 1 | 2 | 3 | P' | P | B |
| P | B | B | G | G | G | 4' | 3' | 2' | 1' | R | A | A | A | A | 1 | 2 | 3 | P' |
| 3 | P' | P | B | B | G | G | G | 4' | 3' | 2' | 1' | R | A | A | A | A | 1 | 2 |
| 1 | 2 | 3 | P' | P | B | B | G | G | G | 4' | 3' | 2' | 1' | R | A | A | A | A |
| A | A | 1 | 2 | 3 | P' | P | B | B | G | G | G | 4' | 3' | 2' | 1' | R | A | A | wherein A is adsorption, 1 is providing gas for a first step of pressure equalization, 2 is providing gas for a second step of pressure equalization, 3 is providing gas for a third stop of pressure equalization, P' is providing purge gas and simultaneously providing gas for a fourth step of pressure equalization, P is providing purge gas, B is counter-current blowdown, G is counter-current purge, 4' is receiving gas for the fourth step of pressure equalization, 3' is receiving gas for the third step of pressure equalization, 2' is receiving gas for the second step of pressure equalization, and 1' is receiving gas for the first step of pressure equalization and simultaneously receiving product gas for repressurization, and R is repressurizing with product gas.

5. A pressure swing adsorption process comprising:

(a) providing an adsorption apparatus having a plurality of beds;

(b) at least one adsorption step comprising feeding a feed mixture to a feed end of a first bed, adsorbing impurities onto an adsorbent in said first bed and permitting a product gas to exit a product end of said first bed;

(c) at least one depressurizing equalization step comprising reducing a pressure in said first bed by closing a feed valve and sequentially releasing gas from a product end of said first bed to other beds or to at least one other bed and a tank;

(d) at least one pressure reduction step comprising further reducing said pressure of said first bed co-currently and/or counter-currently;

(e) at least one counter-current purging step, comprising counter-currently purging said first bed with gas from another bed for a duration such that at least two of said beds of said apparatus are being purged simultaneously throughout said process;

(f) at least one pressure augmenting equalization step comprising increasing the pressure of said first bed with gas released from at least one other bed and/or tank undergoing said pressure reducing step; and (g) at least one repressurization step comprising further increasing said pressure of said first bed by feeding to said first bed at least one of a counter-current stream of product gas and a co-current stream of feed gas, represented by the following cycle chart:

| A | A | A | A | A | A | 1 | 2 | 3 | P' | P | B | B | G | G | G | 4' | 3' | 2' | 1' | I | R | R |
|---|---|---|---|---|---|---|---|---|----|---|---|---|---|---|---|----|----|----|----|---|---|---|
| R | R | A | A | A | A | A | A | 1 | 2 | 3 | P' | P | B | B | G | G | G | 4' | 3' | 2' | 1' | I |

-continued

| | | | | | | | | | | | | | | | | | | | | | |
|---|---|---|---|---|---|---|---|---|---|---|---|---|---|---|---|---|---|---|---|---|---|
| 1' | I | R | R | A | A | A | A | A | 1 | 2 | 3 | P' | P | B | B | G | G | G | 4' | 3' | 2' |
| 3' | 2' | 1' | I | R | R | A | A | A | A | A | 1 | 2 | 3 | P' | P | B | B | G | G | G | 4' |
| G | 4' | 3' | 2' | 1' | I | R | R | A | A | A | A | A | 1 | 2 | 3 | P' | P | B | B | G | G |
| G | G | G | 4' | 3' | 2' | 1' | I | R | R | A | A | A | A | A | 1 | 2 | 3 | P' | P | B | B |
| B | B | G | G | G | 4' | 3' | 2' | 1' | I | R | R | A | A | A | A | A | 1 | 2 | 3 | P' | P |
| P' | P | B | B | G | G | G | 4' | 3' | 2' | 1' | I | R | R | A | A | A | A | A | 1 | 2 | 3 |
| 2 | 3 | P' | P | B | B | G | G | G | 4' | 3' | 2' | 1' | I | R | R | A | k | A | A | A | 1 |
| A | 1 | 2 | 3 | P' | P | B | B | G | G | G | 4' | 3' | 2' | 1' | I | R | R | A | A | A | A |
| A | A | A | 1 | 2 | 3 | P' | P | B | B | G | G | G | 4' | 3' | 2' | 1' | I | R | R | A | A |
| A | A | A | A | A | 1 | 2 | 3 | P' | P | B | B | G | G | G | 4' | 3' | 2' | 1' | I | R | R |
| R | R | A | A | A | A | A | 1 | 2 | 3 | P' | P | B | B | G | G | G | 4' | 3' | 2' | 1' | I | wherein A is adsorption, 1 is providing gas for a first step of pressure equalization, 2 is providing gas for a second step of pressure equalization, 3 is providing gas for a third step of pressure equalization, P' is providing purge gas and simultaneously providing gas for a fourth step of pressure equalization, P is providing purge gas, B is counter-current blowdown, G is counter-current purge, I is idle, 4' is receiving gas for the fourth step of pressure equalization, 3' is receiving gas for the third step of pressure equalization, 2' is receiving gas for the second step of pressure equalization, and 1' is receiving gas for the first step of pressure equalization and simultaneously receiving product gas for repressurization, and R is repressurizing with product gas.

6. A pressure swing adsorption process comprising:

(a) providing an adsorption apparatus having a plurality of beds;

(b) at least one adsorption step comprising feeding a feed mixture to a feed end of a first bed, adsorbing impurities onto an adsorbent in said first bed and permitting a product gas to exit a product end of said first bed;

(c) at least one depressurizing equalization step comprising reducing a pressure in said first bed by closing a feed valve and sequentially releasing gas from a product end of said first bed to other beds or to at least one other bed and a tank;

(d) at least one pressure reduction step comprising further reducing said pressure of said first bed co-currently and/or counter-currently;

(e) at least one counter-current purging step, comprising counter-currently purging said first bed with gas from another bed for a duration such that at least two of said beds of said apparatus are being purged simultaneously throughout said process;

(f) at least one pressure augmenting equalization step comprising increasing the pressure of said first bed with gas released from at least one other bed and/or tank undergoing said pressure reducing step; and (g) at least one repressurization step comprising further increasing said pressure of said first bed by feeding to said first bed at least one of a counter-current stream of product gas and a co-current stream of feed gas, wherein said apparatus has ten beds and four pressure equalizations per bed are performed throughout said process represented by the following cycle chart:

| | | | | | | | | | | | | | | | | | | | | | |
|---|---|---|---|---|---|---|---|---|---|---|---|---|---|---|---|---|---|---|---|---|---|
| A | A | A | A | A | A | A | 1 | 2 | 3 | P' | P | B | B | G | G | G | 4' | 3' | 2' | 1' | R |
| 1' | R | A | A | A | A | A | A | A | 1 | 2 | 3 | P' | P | B | B | G | G | G | 4' | 3' | 2' |
| 3' | 2' | 1' | R | A | A | A | A | A | A | A | 1 | 2 | 3 | P' | P | B | B | G | G | G | 4' |
| G | 4' | 3' | 2' | 1' | R | A | A | A | A | A | A | A | 1 | 2 | 3 | P' | P | B | B | G | G |
| G | G | G | 4' | 3' | 2' | 1' | R | A | A | A | A | A | A | A | 1 | 2 | 3 | P' | P | B | B |
| B | G | G | G | G | 4' | 3' | 2' | 1' | R | A | A | A | A | A | A | A | 1 | 2 | 3 | P' | B |
| P | B | B | G | G | G | G | 4' | 3' | 2' | 1' | R | A | A | A | A | A | A | A | 1 | 2 | 3 | P' |
| 3 | P' | P | B | B | G | G | G | 4' | 3' | 2' | 1' | R | A | A | A | A | A | A | A | 1 | 2 |
| 1 | 2 | 3 | P' | P | B | B | G | G | G | 4' | 3' | 2' | 1' | R | A | A | A | A | A | A | A |
| A | A | 1 | 2 | 3 | P' | P | B | B | G | G | G | 4' | 3' | 2' | 1' | R | A | A | A | A | A |
| A | A | A | A | 1 | 2 | 3 | P' | P | B | B | G | G | G | 4' | 3' | 2' | 1' | R | A | A | A |
| A | A | A | A | A | A | 1 | 2 | 3 | P' | P | B | B | G | G | G | 4' | 3' | 2' | 1' | R | A | wherein A is adsorption, 1 is providing gas for a first step of pressure equalization, 2 is providing gas for a second step of pressure equalization, 3 is providing gas for a third step of pressure equalization, 4 is providing gas for a fourth step of pressure equalization, P is providing purge gas, B is counter-current blowdown, G is counter-current purge, 4' is receiving gas for the fourth step of pressure equalization, 3' is receiving gas for the third step of pressure equalization, 2' is receiving gas for the second step of pressure equalization, and 1' is receiving gas for the first step of pressure equalization and simultaneously receiving product gas for repressurization, and R is repressurizing with product gas.

7. A pressure swing adsorption process comprising:

(a) providing an adsorption apparatus having a plurality of beds;

(b) at least one adsorption step comprising feeding a feed mixture to a feed end of a first bed, adsorbing impurities onto an adsorbent in said first bed and permitting a product gas to exit a product end of said first bed;

(c) at least one depressurizing equalization step comprising reducing a pressure in said first bed by closing a feed valve and sequentially releasing gas from a product end of said first bed to other beds or to at least one other bed and a tank;

(d) at least one pressure reduction step comprising further reducing said pressure of said first bed concurrently and/or counter-currently;

(e) at least one counter-current purging step, comprising counter-currently purging said first bed with gas from another bed for a duration such that at least two of said beds of said apparatus are being purged simultaneously throughout said process;

(f) at least one pressure augmenting equalization step comprising increasing the pressure of said first bed with gas released from at least one other bed and/or tank undergoing said pressure reducing step; and (g) at least one repressurization step comprising further increasing said pressure of said first bed by feeding to said first bed at least one of a counter-current stream of product gas and a co-current stream of feed gas, wherein said apparatus has ten beds and four pressure equalizations per bed are performed throughout said process represented by the following cycle chart:

| A | A | A | A | A | A | 1 | 2 | 3 | P' | P | B | B | G | G | G | G | G | 4' | 3' | 2' | 1' | R |
|---|---|---|---|---|---|---|---|---|----|---|---|---|---|---|---|---|---|----|----|----|----|---|
| 1' | R | A | A | A | A | A | A | 1 | 2 | 3 | P' | P | B | B | G | G | G | G | G | 4' | 3' | 2' |
| 3' | 2' | 1' | R | A | A | A | A | A | 1 | 2 | 3 | P' | P | B | B | G | G | G | G | G | 4' |
| G | 4' | 3' | 2' | 1' | R | A | A | A | A | A | 1 | 2 | 3 | P' | P | B | B | G | G | G | G |
| G | G | G | 4' | 3' | 2' | 1' | R | A | A | A | A | A | 1 | 2 | 3 | P' | P | B | B | G | G |
| G | G | G | G | G | 4' | 3' | 2' | 1' | R | A | A | A | A | A | 1 | 2 | 3 | P' | P | B | B |
| P | B | B | G | G | G | G | G | 4' | 3' | 2' | 1' | R | A | A | A | A | A | 1 | 2 | 3 | P' |
| 3 | P' | P | B | B | G | G | G | G | G | 4' | 3' | 2' | 1' | R | A | A | A | A | A | 1 | 2 |
| 1 | 2 | 3 | P' | P | B | B | G | G | G | G | G | 4' | 3' | 2' | 1' | R | A | A | A | A | A |
| A | A | 1 | 2 | 3 | P' | P | B | B | G | G | G | G | G | 4' | 3' | 2' | 1' | R | A | A | A |
| A | A | A | A | 1 | 2 | 3 | P' | P | B | B | G | G | G | G | G | 4' | 3' | 2' | 1' | R | A | A | wherein A is adsorption, 1 is providing gas for a first step of pressure equalization, 2 is providing gas for a second step of pressure equalization, 3 is providing gas for a third step of pressure equalization, P' is providing purge gas and simultaneously providing gas for a fourth step of pressure equalization, P is providing purge gas, B is counter-current blowdown, G is counter-current purge, 4' is receiving gas for the fourth step of pressure equalization, 3' is receiving gas for the third step of pressure equalization, 2' is receiving gas for the second step of pressure equalization, and 1' is receiving gas for the first step of pressure equalization and simultaneously receiving product gas for repressurization, and R is repressurizing with product gas.

* * * * *

UNITED STATES PATENT AND TRADEMARK OFFICE
CERTIFICATE OF CORRECTION

PATENT NO.    : 6,379,431 B1
DATED         : April 30, 2002
INVENTOR(S)   : Jianguo Xu et al.

It is certified that error appears in the above-identified patent and that said Letters Patent is hereby corrected as shown below:

Column 15,
Lines 35 thru 48, delete the table in its entirety and substitute therefore

--

| A | A | A | A | 1 | 2 | 3 | 4 | P | P | P | B | G | G | G | 4' | 3' | 2' | 1' | R |
|---|---|---|---|---|---|---|---|---|---|---|---|---|---|---|----|----|----|----|---|
| 1' | R | A | A | A | A | 1 | 2 | 3 | 4 | P | P | P | B | G | G | G | 4' | 3' | 2' |
| 3' | 2' | 1' | R | A | A | A | A | 1 | 2 | 3 | 4 | P | P | P | B | G | G | G | 4' |
| G | 4' | 3' | 2' | 1' | R | A | A | A | A | 1 | 2 | 3 | 4 | P | P | P | B | G | G |
| G | G | G | 4' | 3' | 2' | 1' | R | A | A | A | A | 1 | 2 | 3 | 4 | P | P | P | B |
| P | B | G | G | G | 4' | 3' | 2' | 1' | R | A | A | A | A | 1 | 2 | 3 | 4 | P | P |
| P | P | P | B | G | G | G | 4' | 3' | 2' | 1' | R | A | A | A | A | 1 | 2 | 3 | 4 |
| 3 | 4 | P | P | P | B | G | G | G | 4' | 3' | 2' | 1' | R | A | A | A | A | 1 | 2 |
| 1 | 2 | 3 | 4 | P | P | P | B | G | G | G | 4' | 3' | 2' | 1' | R | A | A | A | A |
| A | A | 1 | 2 | 3 | 4 | P | P | P | B | G | G | G | 4' | 3' | 2' | 1' | R | A | A |

--

Line 51, cancel "stop" and insert -- step -- of.

Signed and Sealed this

Eighteenth Day of March, 2003

JAMES E. ROGAN
*Director of the United States Patent and Trademark Office*